(12) United States Patent
Yang et al.

(10) Patent No.: US 6,596,426 B2
(45) Date of Patent: Jul. 22, 2003

(54) METHOD AND APPARATUS FOR THE OPERATION OF A CELL STACK ASSEMBLY DURING SUBFREEZING TEMPERATURES

(75) Inventors: Deliang Yang, Vernon, CT (US); Emily A. Ballinger, Vernon, CT (US); David A. Condit, Avon, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 224 days.

(21) Appl. No.: 09/826,739

(22) Filed: Apr. 5, 2001

(65) Prior Publication Data

US 2002/0146608 A1 Oct. 10, 2002

(51) Int. Cl.⁷ .................................................. H01M 8/04
(52) U.S. Cl. ............................ 429/26; 429/13; 429/24
(58) Field of Search ............................... 429/26, 24, 13

(56) References Cited

U.S. PATENT DOCUMENTS

| | | |
|---|---|---|
| 3,994,748 A | 11/1976 | Kunz et al. |
| 4,344,850 A | 8/1982 | Grasso |
| 4,769,297 A | 9/1988 | Reiser et al. |
| 5,200,278 A * | 4/1993 | Watkins et al. ............ 429/24 |
| 5,456,889 A | 10/1995 | Pow et al. |
| 5,503,994 A | 4/1996 | Meyer et al. |
| 5,514,487 A | 5/1996 | Washington et al. |
| 5,750,076 A | 5/1998 | Buswell et al. |
| 5,798,186 A | 8/1998 | Fletcher et al. |

FOREIGN PATENT DOCUMENTS

| | | |
|---|---|---|
| EP | 0074701 A1 * | 3/1983 |
| EP | 0 823 743 A2 | 11/1998 |

* cited by examiner

*Primary Examiner*—Carol Chaney
(74) *Attorney, Agent, or Firm*—M. P. Williams

(57) ABSTRACT

A coolant system is proposed for addressing temperature concerns during start-up and shut-down of a cell stack assembly. The coolant system comprises a coolant exhaust conduit in fluid communication with a coolant exhaust manifold and a coolant pump, the coolant exhaust conduit enabling transportation of exhausted coolant away from a coolant exhaust manifold. A coolant return conduit is provided to be in fluid communication with a coolant inlet manifold and a coolant pump, the coolant return conduit enabling transportation of the coolant to the coolant inlet manifold. The coolant system further includes a bypass conduit in fluid communication with the coolant exhaust conduit and the coolant return conduit, while a bleed valve is in fluid communication with the coolant exhaust conduit and a gaseous stream. Operation of the bleed valve enables venting of the coolant from the coolant channels, and through said bypass conduit.

13 Claims, 3 Drawing Sheets

METHOD AND APPARATUS FOR THE OPERATION OF A CELL STACK ASSEMBLY DURING SUBFREEZING TEMPERATURES

FIELD OF THE INVENTION

This invention relates in general to a method and apparatus for the operation of a cell stack assembly during subfreezing temperatures, and deals more particularly with a method and apparatus by which cell stack assemblies may avoid structural damage to their constituent parts when experiencing harsh environmental conditions, especially during times of operational shut-down or start-up.

BACKGROUND OF THE INVENTION

Electrochemical fuel cell assemblies are known for their ability to produce electricity and a subsequent reaction product through the reaction of a fuel being provided to an anode and an oxidant being provided to a cathode, thereby generating a potential between these electrodes. Such fuel cell assemblies are very useful and sought after due to their high efficiency, as compared to internal combustion fuel systems and the like. Fuel cell assemblies are additionally advantageous due to the environmentally friendly chemical reaction by-products that are produced, such as water. In order to control the temperature within the fuel cell assembly, a coolant is provided to the fuel cell assembly. The coolant, typically water, is circulated throughout the fuel cell assembly via a configuration of coolant channels. The use of water within fuel cell assemblies makes them particularly sensitive to freezing temperatures.

Electrochemical fuel cell assemblies typically employ a hydrogen-rich gas as the fuel and oxygen as an oxidant where, as noted above, the reaction by-product is water. Such fuel cell assemblies may employ a membrane consisting of a solid polymer electrolyte, or ion exchange membrane, having a catalyst layer formed thereon so as to promote the desired electrochemical reaction. The catalyzed membrane is disposed between two electrode substrates formed of porous, electrically conductive sheet material—typically carbon fiber paper. The ion exchange membrane is also known as a proton exchange membrane (hereinafter PEM), such as sold by DuPont under the trade name NAFION™.

In operation, hydrogen fuel permeates the porous electrode substrate material of the anode and reacts at the catalyst layer to form hydrogen ions and electrons. The hydrogen ions migrate through the membrane to the cathode and the electrons flow through an external circuit to the cathode. At the cathode, the oxygen-containing gas supply also permeates through the porous electrode substrate material and reacts with the hydrogen ions, and the electrons from the anode at the catalyst layer, to form the by-product water. Not only does the ion exchange membrane facilitate the migration of these hydrogen ions from the anode to the cathode, but the ion exchange membrane also acts to isolate the hydrogen fuel from the oxygen-containing gas oxidant. The reactions taking place at the anode and cathode catalyst layers may be represented by the equations:

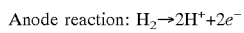
Anode reaction: $H_2 \rightarrow 2H^+ + 2e^-$

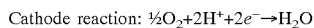
Cathode reaction: $\frac{1}{2}O_2 + 2H^+ + 2e^- \rightarrow H_2O$

Conventional PEM fuels cells have the membrane electrode assembly, comprised of the PEM and the electrode substrates, positioned between two gas-impermeable, electrically conductive plates, referred to as the anode and cathode plates. The plates are typically formed from graphite, a graphite-polymer composite, or the like. The plates act as a structural support for the two porous, electrically conductive electrodes, as well as serving as current collectors and providing the means for carrying the fuel and oxidant to the anode and cathode, respectively. They are also utilized for carrying away the reactant by-product water during operation of the fuel cell.

When flow channels are formed within these plates for the purposes of circulating either fuel or oxidant in the anode and cathode plates, they are referred to as fluid flow field plates. These plates may also function as water transfer plates in certain fuel cell configurations and usually contain integral coolant passages, thereby also serving as cooler plates in addition to their well known water management functions. When the fluid flow field plates simply overlay channels formed in the anode and cathode porous material, they are referred to as separator plates. Moreover, the fluid flow field plates may have formed therein reactant feed manifolds, which are utilized for supplying fuel to the anode flow channels or, alternatively, oxidant to the cathode flow channels. They may also have corresponding exhaust manifolds to direct unreacted components of the fuel and oxidant streams, and any water generated as a by-product, from the fuel cell. Alternatively, the manifolds may be external to the fuel cell itself, as shown in commonly assigned U.S. Pat. No. 3,994,748 issued to Kunz et al. and incorporated herein by reference in its entirety.

The catalyst layer in a fuel cell assembly is typically a carbon supported platinum or platinum alloy, although other noble metals or noble metal alloys may be utilized. Multiple electrically connected fuel cell assemblies, consisting of two or more anode plate/membrane/cathode plate combinations, may be referred to as a cell stack assembly. A cell stack assembly is typically electrically connected in series.

Recent efforts at producing the fuel for fuel cell assemblies have focused on utilizing a hydrogen-rich gas stream produced from the chemical conversion of hydrocarbon fuels, such as methane, natural gas, gasoline or the like. This process produces a hydrogen-rich gas stream efficiently as possible, thereby ensuring that a minimal amount of carbon monoxide and other undesirable chemical byproducts are produced. This conversion of hydrocarbons is generally accomplished through the use of a steam reformer and related fuel processing apparatus well known in the art.

As discussed previously, the anode and cathode plates may be provided with coolant channels for the circulation of a water coolant, as well as the wicking and carrying away of water produced as a by-product of the fuel cell assembly operation. The water so collected and circulated through a fuel cell assembly in the coolant channels is susceptible to freezing below 32° F. (0° C.) and may therefore damage and impair the operation of the fuel cell assembly as the water expands when it freezes. It is therefore necessary to provide a method and apparatus, which may protect the fuel cell assembly during times of harsh environmental conditions.

U.S. Pat. No. 5,798,186 issued to Fletcher et al. on Aug. 25, 1998 discloses various electrical heating configurations for directly and indirectly thawing a fuel cell stack, which has frozen. Additionally, mention is made as to having compliant or compressible devices located within the stack manifold headers to accommodate the expansion of freezing water within the fuel cell stack. Such a system, localized only within the stack manifold headers, will not fully protect the entirety of the fuel cell stack or coolant channels from the effects of freezing and expanding coolant.

In particular, there are those situations where the start-up of the fuel cell assembly is desired after a time of inactivity in subfreezing environmental conditions. In such cases it has been discovered that attempting to circulate coolant through the coolant channels, in order to alleviate the freezing conditions within the fuel cell assembly, does not result in acceptable performance characteristics. When, for example, water is utilized as the coolant, the temperature of the fuel cell assembly typically causes localized freezing at the input to the small-dimensioned coolant channels, thereby partially blocking circulation therethrough and unduly lengthening the time required for start-up. When non-porous coolant channels or plates are utilized in conjunction with an antifreeze solution coolant, similar problems exist due the high viscosity of the antifreeze solution at low temperatures, again lengthening the time required for start-up.

With the forgoing problems and concerns in mind, it is the general object of the present invention to provide a fuel cell assembly with a method and apparatus which overcomes the above-described drawbacks even in times of subfreezing temperatures.

SUMMARY OF THE INVENTION

It is an object of the present invention to provide a method and apparatus for the operation of a cell stack assembly during subfreezing temperatures.

It is another object of the present invention to provide a shut-down procedure for a cell stack assembly which protects the cell stack assembly even during times of subfreezing temperatures.

It is another object of the present invention to provide a start-up procedure for a cell stack assembly which protects the cell stack assembly even during times of subfreezing temperatures.

It is another object of the present invention to utilize a thermally insulating coolant accumulator to assist in quickly raising the temperature of the cell stack assembly.

According to one embodiment of the present invention a coolant system is proposed for a cell stack assembly which includes a coolant pump for circulating a coolant and coolant channels in fluid communication with a coolant inlet manifold and a coolant exhaust manifold. The coolant system comprises a coolant exhaust conduit in fluid communication with the coolant exhaust manifold and the coolant pump, the coolant exhaust conduit enabling transportation of exhausted coolant away from the coolant exhaust manifold. A coolant return conduit is provided to be in fluid communication with the coolant inlet manifold and the coolant pump, the coolant return conduit enabling transportation of the coolant to the coolant inlet manifold. The coolant system further includes a bypass conduit in fluid communication with the coolant exhaust conduit and the coolant return conduit, while a bleed valve is in fluid communication with the coolant exhaust conduit and a gaseous stream. Operation of the bleed valve enables venting of the coolant from the coolant channels, and through said bypass conduit.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
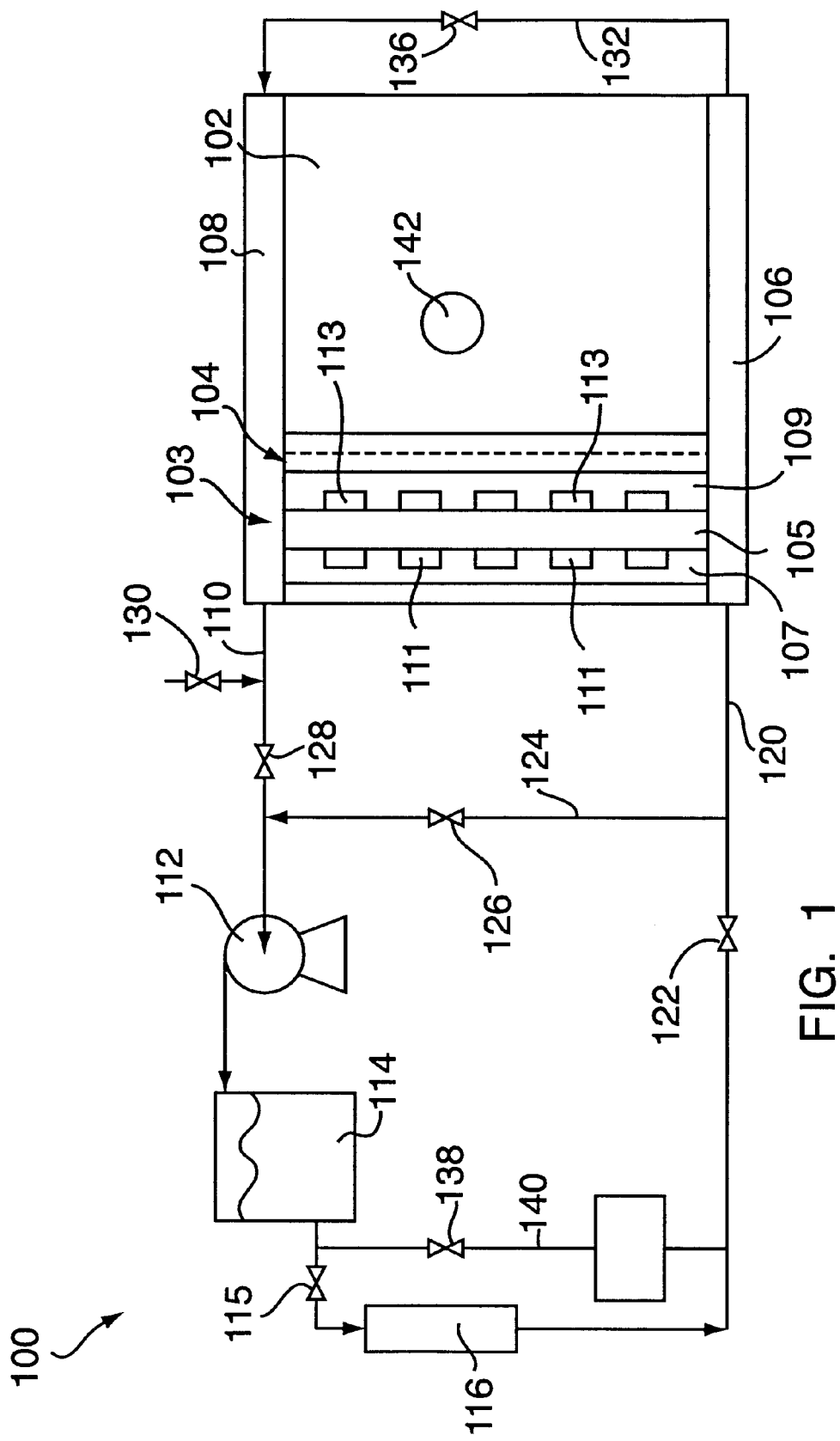
FIG. 1 is a schematic illustration of a coolant system, according to one embodiment of the present invention.

FIG. 1 illustrates a coolant system 100, according to one embodiment of the present invention which may be operated to protect a cell stack assembly 102 from the detrimental effects of subfreezing temperatures during start-up and shut-down procedures. As depicted in FIG. 1, the cell stack assembly (hereinafter 'CSA') 102 is comprised of a plurality of fuel cell assemblies 103 in electrical communication with one another. The fuel cell assemblies may each employ an ion exchange membrane consisting of a solid polymer electrolyte disposed between an anode electrode substrate and a cathode electrode substrate. An anode plate 107 and a cathode plate 109 support reactant fuel channels 111 and reactant oxidant channels 113, respectively. The ion exchange membrane may be a proton exchange membrane (PEM) 105 comprising a polymer film approximately 0.001 inch thick. The cathode and the anode electrode substrates are typically formed of porous, electrically conductive sheet material—typically carbon fiber paper having a Teflon® coating. Coolant channels 104 are formed within typically porous coolant plates, or the like, in each of these PEM fuel cell assemblies 103, wherein water is typically utilized as the coolant circulating through the coolant channels 104.

While PEM fuel cell assemblies have been described, the present invention is not limited in this regard as other membranes and electrode materials may be alternatively utilized, providing they allow for the necessary flow of reactant and by-product molecules, ions and electrons. In particular, fuel cell assemblies utilizing an antifreeze solution circulating through coolant channels in non-porous coolant plates may also be employed without departing from the broader aspects of the present invention.

Still in reference to FIG. 1, a coolant inlet manifold 106 substantially evenly distributes a coolant to a plurality of coolant channels 104, which are designed to uniformly circulate the coolant about each of the fuel cell assemblies 103 comprising the cell stack assembly 102. The coolant channels 104 are themselves exhausted to a coolant exhaust manifold 108 after the coolant has circulated through the cell stack assembly 102. Exhausted coolant leaves the coolant manifold 108 via a coolant exhaust conduit 110 under the dynamic force of a coolant pump 112. The coolant is then directed to an accumulator 114 prior to being shunted, with varying ratios, to a heat exchanger 116 and an instantaneous heater 118, as will be described in more detail later. A coolant return conduit 120 is subsequently provided to funnel the coolant once again to the coolant inlet manifold 106.

When PEM fuel cell assemblies having porous coolant channels or plates are utilized in the cell stack assembly 102, the coolant circulating through the various components of FIG. 1 is maintained at a subambient pressure by the coolant pump 112 and a coolant inlet pressure control valve 122. By maintaining the coolant at subambient pressures while adapting the reactants flows to be above ambient pressures, the accumulation of liquid coolant in either the fuel or the oxidant reactant streams is effectively avoided. Moreover, the inclusion of the heat exchanger 116 provides a known means to remove the heat absorbed by the circulating coolant prior to the coolant being directed back to the cell stack assembly 102.

As described above, the coolant system 100 of FIG. 1 thereby provides for the continuous supply and circulation of a coolant, typically water, throughout the cell stack assembly 102 during active operation thereof. While it should be readily apparent that utilizing a water coolant within the cell stack assembly 102 is beneficial for the purposes of water and thermal management, problems arise when the cell stack assembly 102 experiences temperatures at or below the freezing point of water; that is, temperatures at or below 32° F. (0° C.). During times when the cell stack assembly 102 experiences such temperatures, the water contained within the cell stack assembly 102 begins to freeze and expand, and may possibly cause damage to components of cell stack assembly 102. It would therefore be very beneficial to equip the cell stack assembly 102 with an apparatus which compensates for the freezing of the water coolant and assuredly prevents corresponding damage during times of shut-down and start-up.

It is therefore an important aspect of the present invention to provide a method and apparatus for safely executing a shut down procedure for the cell stack assembly 102 during times of subfreezing temperatures. In known practices, when shut-down of the cell stack assembly 102 is ordered, the water coolant is allowed to drain from the cell stack assembly 102 under the force of gravity. In effect, this means that the pressure differential between the coolant supply and the reactant streams is no longer maintained by the coolant pump 112 and the pressure control valve 122, hence, the coolant will slump down into the reactant flow fields leaving a portion of the cell stack assembly 102 immersed in a mixture of water, fuel and oxidant. This condition may last indefinitely during the shut-down period or, rather, may affect the cell stack assembly 102 for a shorter time. In either case, damage may be effected upon the cell stack assembly 102 during the time that the water coolant is allowed to pool within the cell stack assembly 102 in an environment of subfreezing temperatures.

Figure 2:
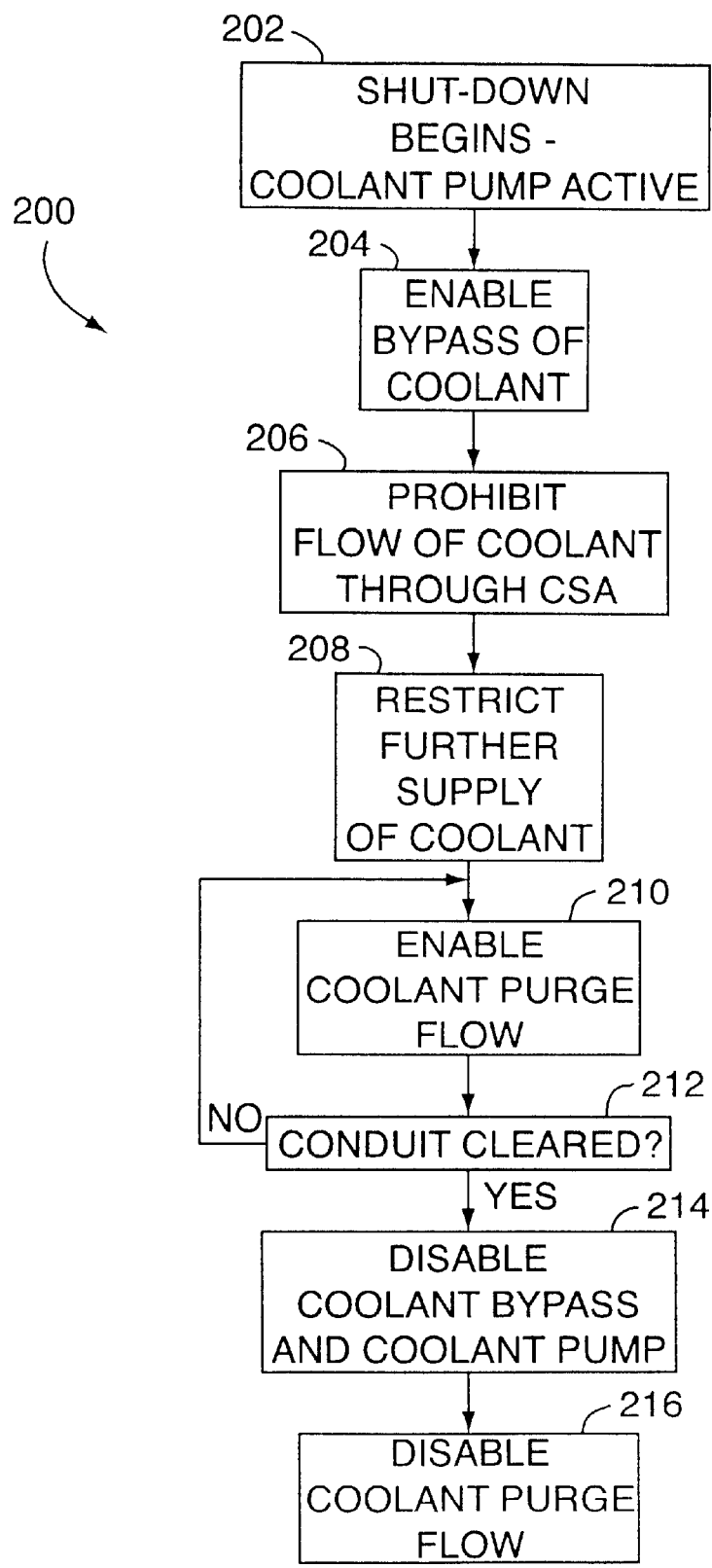
FIG. 2 is a flow diagram illustrating the operation of the coolant system in FIG. 1 during a shut-down procedure.

FIG. 2 illustrates a shut-down procedure 200 according to one embodiment of the present invention which avoids the above-described drawbacks and ensures that a shut-down operation of the cell stack assembly 102 may be accomplished during subfreezing temperatures without harm to the cell stack assembly 102. The shut-down procedure 200 described herein is preferably begun after the electrical load has been removed from the cell stack assembly 102, and after the reactant flows have been stopped and any corrosion control steps have been completed.

The shut-down procedure 200 utilizes a shut-down bypass conduit 124 and an influx of venting air, or the like. With reference to FIGS. 1 and 2 in combination, the shut-down procedure 200 according to the present invention begins in step 202 by initiating, either manually or automatically, a shut-down sequence. As indicated in step 202, the coolant pump 112 continues to operate after shut-down has been initiated in order to maintain the subambient pressure within the coolant conduits. In this manner, the present invention avoids the previously mentioned problem of the coolant slumping in the reactant and coolant flow fields.

Returning to step 204 of the shut-down procedure 200 of FIG. 2, a shutdown valve 126 is opened in order to divert a substantial portion of a coolant stream through the shut-down bypass conduit 124. A coolant exit valve 128, situated along the coolant exhaust conduit 110, is then closed in subsequent step 206 in order to prohibit the flow of coolant through the cell stack assembly 102. In step 208 the cell stack assembly 102 is isolated from any additional supply of coolant by closing the pressure control valve 122, while step 210 operates to open a bleed valve 130, thereby placing the coolant system 100 in communication with an air supply. In the preferred embodiment of the present invention, the bleed valve 130 is in communication with an external ambient air supply or atmosphere and serves to vent the coolant system by allowing ambient air to be bled into the coolant conduits and flow fields. As will be appreciated, the venting action is enabled by the continued operation of the coolant pump 112 which maintains a vacuum on the coolant conduits and flow fields.

While the present invention has been described as venting the coolant conduits and flow fields with an ambient air supply, alternative methods for evacuating the coolant from the coolant conduits and flow fields may be employed without departing from the broader aspects of the present invention. A pressurized source of air may alternatively be placed in communication with the coolant conduits and flow fields upon the opening of the bleed valve 130, thus purging the coolant conduits and flow fields of any remaining coolant.

As discussed above, by closing the various valves of the coolant system 100 as described above, the air which is drawn through the bleed valve 130 serves to vent the coolant exhaust manifold 108, the coolant channels 104 and the coolant inlet manifold 106 of any coolant remaining therein. The vented coolant is directed through the shut-down bypass conduit 124 and eventually deposited into the accumulator 114, leaving the reactant and coolant channels in the cell stack assembly 102 free of substantially all of the water coolant, although some water may remain within the porous water transport plates.

During the venting process, it is determined in step 212 whether there still remains any coolant in the reactant and coolant channels in the cell stack assembly 102. As long as coolant is detected, the purging process continues as described above. When it is determined that substantially no coolant remains in the cell stack assembly 102, the shut-down bypass conduit 124 is closed and the coolant pump 112 is disabled in step 214. The bleed valve 130 is subsequently closed in step 216 to end the purging process of the shut-down procedure 200. As will be appreciated, various sensor assemblies may be situated in the coolant exhaust manifold 108, the coolant inlet manifold 106, or the coolant return conduit 120 to determine if there remains any excess water coolant in the cell stack assembly 102, in accordance with step 212.

The effect of the shut-down procedure 200 is to remove substantially all of the coolant from the cell stack assembly 102, thereby preventing the detrimental expansion of the coolant within the cell stack assembly 102 during the period of time following shut-down in subfreezing temperatures.

After shut-down, the cell stack assembly 102 faces the related challenge of implementing a start-up command in subfreezing temperatures. For practical concerns, including economics and reliability, it is important that the cell stack assembly 102 begin producing electricity as soon as possible after receiving a start-up command. In addition, it is operationally critical that the cell stack assembly 102 be capable of quickly circulating the coolant and reactant flows immediately after start-up is initiated, as damage to the cell stack assembly 102 may occur should a significant time lag occur between these two events. It is therefore an important aspect of the present invention to provide a method and apparatus for a start-up procedure of the cell stack assembly 102 during times of subfreezing temperatures.

Figure 3:
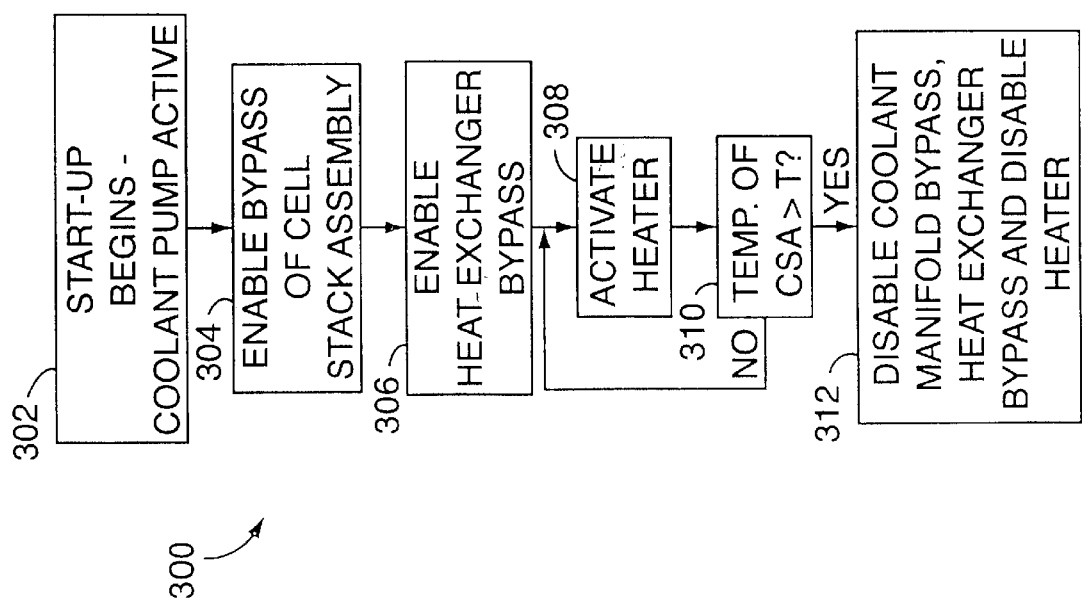
FIG. 3 is a flow diagram illustrating the operation of the coolant system in FIG. 1 during a start-up procedure.

FIG. 3 illustrates a start-up procedure 300 for ensuring that a start-up operation of the cell stack assembly 102 may be accomplished during subfreezing temperatures by utilizing a start-up bypass conduit 132. It has been discovered that by permitting a warmed coolant to flow through the inlet and exhaust coolant manifolds, 106 and 108 respectively, it is possible to quickly raise the temperature of the cell stack assembly 102 by conduction, without the need for significant flow through the coolant channels 104 themselves. As mentioned previously, by substantially avoiding the coolant channels 104 during the initial start-up of a subfreezing cell stack assembly, the formation of frozen blockages in the coolant channels, and hence possible harm to the cell stack assembly 102 as a whole, may be effectively avoided.

With reference to FIGS. 1 and 3 in combination, the start-up procedure 300 according to the present invention begins in step 302 by initiating, either manually or automatically, a start-up sequence. The start-up sequence in step 302 includes activating the coolant pump 112, as well as ensuring that the shutdown valve 126 is closed and the pressure control valve 122 is open. In step 304 a bypass of the cell stack assembly 102 is accomplished by opening a start-up valve 136 located along the start-up bypass conduit 132. In this manner, coolant which is provided to the coolant inlet manifold 106 is substantially entirely directed through the start-up bypass conduit 132 and back into the coolant exhaust manifold 108, thereby initially avoiding the coolant channels 104.

In step 306 the heat exchanger 116 is bypassed by opening the heat bypass valve 138 situated along the heat bypass conduit 140. A thermostat-valve assembly 115 is utilized to ensure that no coolant is permitted to flow through the heat exchanger 116 until start-up of the cell stack assembly 102 has been accomplished and/or the coolant temperature exceeds a predetermined temperature.

Subsequent to opening the heat bypass valve 138 of FIG. 1, the coolant circulated by the pump 112 will be directed through the instantaneous heater 118, which is activated in step 308, for quickly raising the temperature of the coolant provided to the coolant manifolds, 106 and 108, respectively. As discussed above, as the heated coolant is circulated through both the coolant inlet manifold 106 and the coolant exhaust manifold 108 the cell stack assembly 102 will quickly become heated due to heat conduction stemming from the coolant manifolds, 106 and 108. A temperature sensor 142 monitors the temperature of the cell stack assembly 102, in step 310, to determine if the cell stack assembly 102 has risen above a predetermined temperature T. Once the cell stack assembly 102 has risen above the predetermined temperature T, step 312 of the start-up procedure 300 closes the start-up valve 136 and the heat bypass valve 138, as well as shutting down the instantaneous heater 118.

It will be readily appreciated that the predetermined temperature T is preferably set as a temperature threshold which would ensure that coolant provided to the coolant channels 104 will not freeze and block the coolant channels 104. Most preferably, the predetermined temperature T is set at approximately 32° F. or higher. Moreover, the temperature sensor 142 may be oriented at various locations within the cell stack assembly 102, however, orientation at a centermost location is preferable to ensure that warming of the entirety of the cell stack assembly has been substantially accomplished.

As described herein, the start-up procedure 300 is equally applicable to PEM fuel cells which utilize a water coolant with porous water transport plates, as well as for those fuel cells which utilize an antifreeze coolant having nonporous water transport plates.

Yet another important feature of the coolant system 100, as depicted in FIG. 1, is the utilization of the accumulator 114 to assist in start-up procedures. In accordance with the present invention, the accumulator 114 is designed to be insulated so as to keep the coolant deposited therein at elevated temperatures, thereby assisting the start-up procedure 300 shown in FIG. 3. It will be readily appreciated that the accumulator 114 may be a thermos-type structure having thermally reflective components, including multi-walled structures, or any alternative design provided that the stored coolant retains significant thermal energy for periods extending to several days or more.

Figure 4:
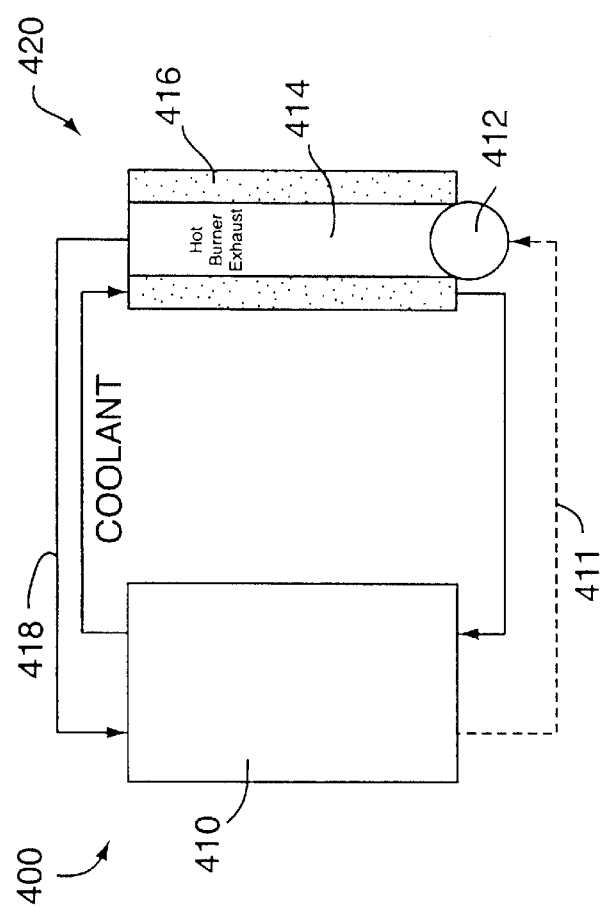
FIG. 4 is a schematic illustration of a coolant system, according to another embodiment of the present invention

FIG. 4 illustrates a coolant system 400 according to another embodiment of the present invention. The coolant system 400 may be utilized to quickly raise the temperature of a cell stack assembly 410 by heating the coolant stream provided to the cell stack assembly 410. As depicted in FIG. 4, a burner 412 combusts a residual fuel source, exhausted from unillustrated reactant fuel flow fields of the cell stack assembly 410 via a fuel exhaust conduit 411. This heated burner exhaust is subsequently exhausted into a tube portion 414 of a shell and tube heat exchanger 420. In conjunction with the heated burner exhaust being fed through the tube portion 414, a shell 416 accepts a coolant stream therein so as to promote a heat exchange between the burner exhaust and the coolant stream. The newly heated coolant stream is subsequently introduced into the cell stack assembly 410, resulting in an increased rate of warming for the cell stack assembly 410.

To further increase the rate of heating the cell stack assembly 410, the present invention further contemplates channeling the heated burner exhaust, via heat conduit 418, to the anode and/or cathode flow fields of the cell stack assembly 410. The present invention also contemplates incorporating the coolant system 400 of FIG. 4 into the coolant system 100 of FIG. 1, without departing from the broader aspects of the present invention.

While the present invention describes combusting residual, exhausted reactant fuel in the burner 412, the present invention is not so limited as the burner 412 may be supplied with its own fuel supply without departing from the broader aspects of the present invention.

It is a major aspect of the present invention, therefore, to provide a coolant system for a cell stack assembly which not only provides protection against the destructive effects of subfreezing temperatures during shut-down and cell stack inactivity, but also operates to quickly raise the cell stack assembly above freezing temperatures during a start-up procedure.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A fuel cell system, comprising: a plurality of fuel cells arranged in a stack including a coolant inlet manifold having an inlet and a coolant exhaust manifold having an outlet, and coolant channels for flowing coolant from said inlet manifold to said exhaust manifold;
a coolant pump having an inlet;
a coolant inlet valve for selectively interconnecting the inlet of said inlet manifold with coolant from said pump;
characterized by:
a coolant exit valve for selectively interconnecting the inlet of said pump with the outlet of said exhaust manifold;
a shutdown valve for selectively interconnecting the inlet of said inlet manifold with the inlet of said pump; and
a bleed valve for selectively allowing gas to flow into the outlet of said exhaust manifold;
whereby opening of said shutdown valve and said bleed valve and closing said inlet valve and said outlet valve with said pump running will draw gas into, and thereby draw coolant out of, said outlet manifold, said coolant channels and said inlet manifold.

2. A fuel cell system according to claim 1, further comprising:
an accumulator oriented downstream from said coolant pump for accumulating coolant.

3. A fuel cell system according to claim 2, wherein:
said accumulator is thermally insulated.

4. A fuel cell system according to claim 1, wherein:
said gas is an air stream.

5. A fuel cell system according to claim 4, wherein:
said air is one of ambient air and pressurized air.

6. A fuel cell system, comprising:
a plurality of fuel cells arranged in a stack including a coolant inlet manifold having an inlet and a coolant exhaust manifold having an outlet, and coolant channels for flowing coolant from said inlet manifold to said exhaust manifold;
a coolant pump having an inlet;
characterized by:
means for blocking flow of coolant from said pump so that it does not enter the inlet of said inlet manifold;
means for blocking the flow of coolant from the outlet of said exhaust manifold to the inlet of said pump;
means for connecting the inlet of said inlet manifold to the inlet of said pump; and
means for connecting the outlet of said exhaust manifold to a source of gas;
whereby gas is drawn by said pump through said fuel cell stack to thereby dry it out.

7. A method of shutting down a fuel cell system comprising a plurality of fuel cells arranged in a stack, including a coolant inlet manifold having an inlet and a coolant exhaust manifold having an outlet, and coolant channels for flowing coolant from said inlet manifold to said exhaust manifold, and including a coolant pump having an inlet;
said method characterized by:
blocking flow of coolant from said pump so that it does not enter the inlet of said inlet manifold;
blocking the flow of coolant from the outlet of said exhaust manifold to the inlet of said pump;
connecting the inlet of said inlet manifold to the inlet of said pump; and
connecting the outlet of said exhaust manifold to a source of gas;
whereby gas is drawn by said pump through said fuel cell stack to thereby dry it out.

8. A fuel cell stack system, comprising:
a plurality of fuel cells arranged in a stack, including a coolant inlet manifold and a coolant exhaust manifold, and coolant channels for flowing coolant from said inlet manifold to said exhaust manifold; and
a coolant pump;
characterized by:
a coolant heater for heating coolant from said pump; and
a coolant bypass for selectively flowing coolant from said inlet manifold directly to said exhaust manifold apart from passing through said channels, whereby operating said heater and opening said bypass will heat said fuel cells with heated coolant flowing through said manifolds without passage of substantial coolant through said channels.

9. A fuel cell system according to claim 8, further comprising:
a thermally insulated accumulator oriented downstream of said coolant pump, between said coolant pump and said heater, for accumulating excess quantities of said coolant stream.

10. A fuel cell system, comprising:
a plurality of fuel cells arranged in a stack including a coolant inlet manifold and a coolant exhaust manifold, and coolant channels for flowing coolant from said inlet manifold to said exhaust manifold;
a coolant pump;
means for heating the coolant from said pump; and
means for flowing heated coolant from said inlet manifold directly to said exhaust manifold apart from flowing through said channels, whereby said fuel cells are heated with heated coolant flowing through said manifolds without passage of substantial coolant through said channels.

11. A method of starting up a fuel cell system comprising a plurality of fuel cells arranged in a stack, including a coolant inlet manifold and a coolant exhaust manifold, and coolant channels for flowing coolant from said inlet manifold to said exhaust manifold, and including a coolant pump, said method characterized by:
heating the coolant from said pump;
flowing heated coolant from said inlet manifold directly to said exhaust manifold apart from flowing through said channels, thereby to heat said fuel cells with heated coolant flowing through said manifolds without passage of substantial coolant through said channels.

12. A fuel cell system, comprising:
a plurality of fuel cells arranged in a stack including a coolant inlet manifold having an inlet and a coolant exhaust manifold having an outlet, and coolant channels for flowing coolant from said inlet manifold to said exhaust manifold;
a coolant pump having an inlet;
a coolant inlet valve for selectively interconnecting the inlet of said inlet manifold with coolant from said pump;
characterized by:
a coolant exit valve for selectively interconnecting the inlet of said pump with the outlet of said exhaust manifold;
a shutdown valve for selectively interconnecting the inlet of said inlet manifold with the inlet of said pump;
a bleed valve for selectively allowing gas to flow into the outlet of said exhaust manifold;

a coolant heater for selectively heating coolant from said pump; and a coolant bypass for selectively flowing coolant from said inlet manifold directly to said exhaust manifold apart from passing through said channels, whereby opening of said shutdown valve and said bleed valve and closing said inlet valve and said outlet valve with said pump running will draw gas into, and thereby draw coolant out of, said outlet manifold, said coolant channels and said inlet manifold, and whereby operating said heater and opening said bypass will heat said fuel cells with heated coolant flowing through said manifolds without passage of substantial coolant through said channels.

13. A method of shutting down and starting up a fuel cell system comprising a plurality of fuel cells arranged in a stack, including a coolant inlet manifold having an inlet and a coolant exhaust manifold having an outlet, and coolant channels for flowing coolant from said inlet manifold to said exhaust manifold, and including a coolant pump having an inlet;

said method characterized by:

during shut down blocking flow of coolant from said pump so that it does not enter the inlet of said inlet manifold;

blocking the flow of coolant from the outlet of said exhaust manifold to the inlet of said pump;

connecting the inlet of said inlet manifold to the inlet of said pump; and connecting the outlet of said exhaust manifold to a source of gas;

whereby gas is drawn by said pump through said fuel cell stack to thereby dry it out; and during start up heating the coolant from said pump; and flowing heated coolant from said inlet manifold directly to said exhaust manifold apart from flowing through said channels, thereby to heat said fuel cells with heated coolant flowing through said manifolds without passage of substantial coolant through said channels.

* * * * *